United States Patent [19]

Lüchinger et al.

[11] 4,148,370

[45] Apr. 10, 1979

[54] TOP LOADING PRECISION BALANCE

[75] Inventors: Paul Lüchinger, Greifensee; Ernst Strickler, Wolfhausen, both of Switzerland

[73] Assignee: Mettler Instrumente AG, Zurich, Switzerland

[21] Appl. No.: 849,667

[22] Filed: Nov. 8, 1977

[30] Foreign Application Priority Data

Dec. 14, 1976 [CH] Switzerland .................. 15691/76

[51] Int. Cl.² .................. G01G 3/14; G01G 7/00; G01G 21/28
[52] U.S. Cl. .................. 177/210 EM; 177/212; 177/180
[58] Field of Search .................. 177/180, 210 EM, 212

[56] References Cited
U.S. PATENT DOCUMENTS

| 4,090,575 | 5/1978 | Kunz et al. .................. 177/210 EM |
| 4,099,587 | 7/1978 | Kaufmann .................. 177/212 X |

Primary Examiner—George H. Miller, Jr.
Attorney, Agent, or Firm—Hans Berma

[57] ABSTRACT

The magnet system of a top-loading precision balance with electromagnetic load compensation is fixedly fastened in an aluminum alloy frame constituting the fixed link in the parallelogram suspension for the weighing pan. Distortion of the frame under thermal stresses due to the different coefficients of expansion of the ferrous metal of the magnet system and the light metal of the frame is prevented by openings in the frame walls spacedly surrounding the portions of the frame wall fixedly fastened to the magnet system.

7 Claims, 3 Drawing Figures

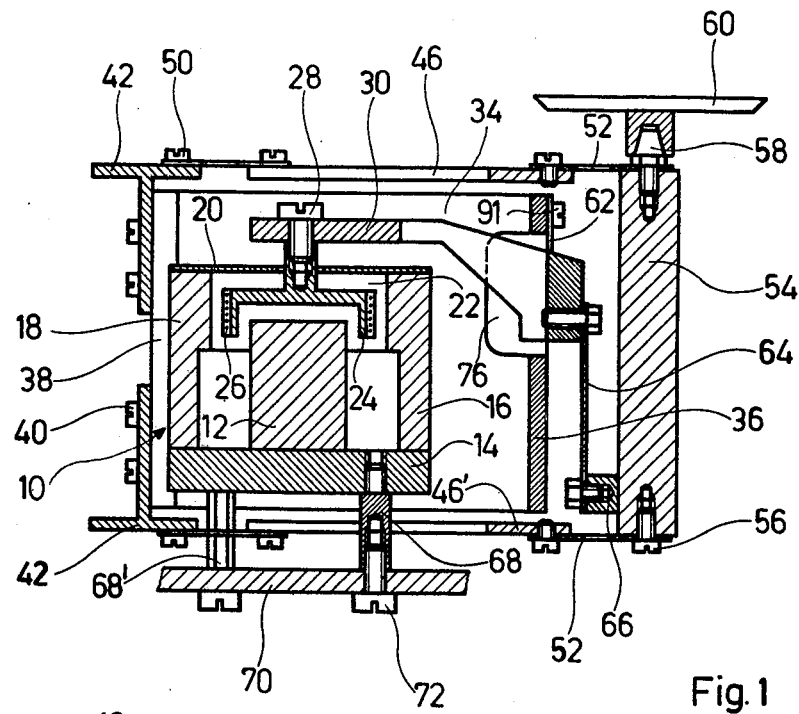
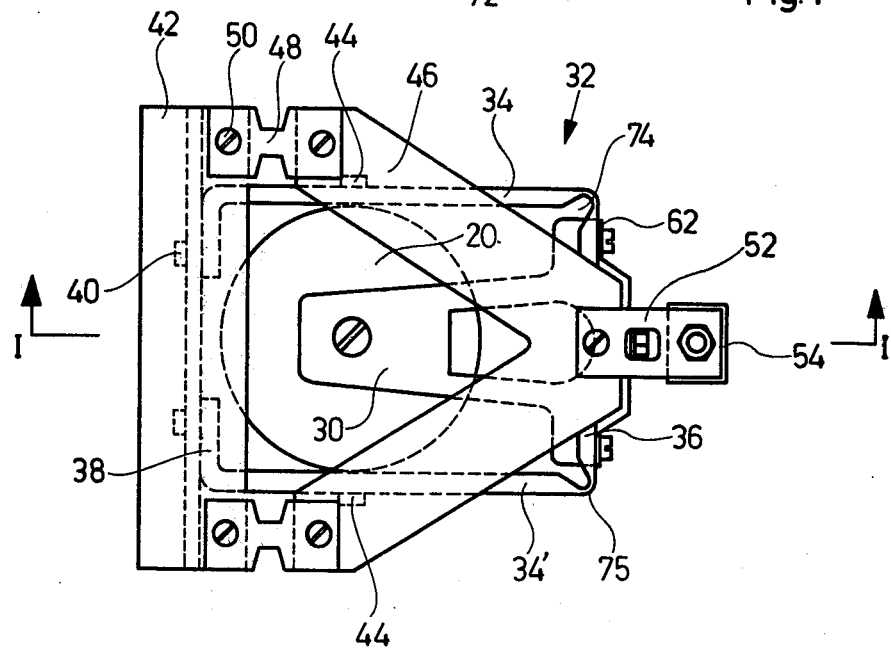
Fig. 1

TOP LOADING PRECISION BALANCE

This invention relates to precision balances, and particularly to top-loading balances in which the weighing pan is mounted on supporting structure by a parallelogram suspension, and vertical displacement of the pan is sensed and compensated by an electromagnetic compensating system.

In balances of the type described, a coil connected to the weighing pan moves in the air gap of a magnet system, and electric current flowing through the coil may be adjusted to return the pan to a predetermined position after displacement by a load. The magnitude of the restoring current is a measure of the load weight.

The use of magnetic materials adjacent the magnet system and the coil must be held to a minimum, and preferably avoided for high precision of weighings. Conveniently available materials of construction other than metals lack the rigidity required in the weighing cell of the balance, and the choice of materials is thus practically limited to non-magnetic metals. Light metal alloys are preferred because of their low cost and the ease with which they can be shaped. Their coefficients of thermal expansion are approximately twice the corresponding coefficients of ferrous metals. Differential thermal expansion of the magnet system and of associated balance elements of light metal can cause distortion in the weighing cell, and particularly in the parallelogram suspension for the weighing pan which sharply reduce the precision of the balance.

It is a primary object of this invention to provide a precision balance of the afore-described type which is insensitive to temperature changes in the ambient atmosphere and to temperature changes in the balance structure due to the flow of electric current, yet may have a weighing cell of light metal elements fixedly fastened to a magnet system mainly consisting of ferrous metal of different coefficient of thermal expansion.

With this object and others in view, the invention in one of its more specific aspects provides a precision balance having a frame of non-magnetic material defining a cavity therein. At least one part of the frame differs from the remainder of the frame by reduced cross section and thereby enhanced flexibility transverse to a plane of reference. The remainder of the frame includes means for enchancing the rigidity of the frame in this plane. A magnet system is mounted on the frame in the cavity and bounds an air gap. A parallelogram suspension assembly includes a plurality of elements hingedly connected for movement in the reference plane, and one element of the suspension is constituted by a portion of the frame. Another element of the assembly includes a support for a weighing pan which performs translatory movement in the reference plane while being substantially prevented from angular movement in the plane.

A motion transmitting member pivotally mounted on the frame is operatively connected to the pan-supporting suspension element for joint movement with the weighing pan. A coil of electrically conductive material mounted on the motion transmitting member moves in the air gap of the magnet system during the joint movement of the weighing pan and of the motion transmitting member.

Additional features, other objects, and many of the attendant advantages of this invention will readily be appreciated as the same becomes better understood by reference to the following detailed description of a preferred embodiment when considered in connection with the appended drawing in which:

FIG. 1 shows a top-loading precision balance of the invention in fragmentary, sectional side-elevation on the line I—I in FIG. 2;

FIG. 2 is a top plan view of the device of FIG. 1; and

Figure 3:
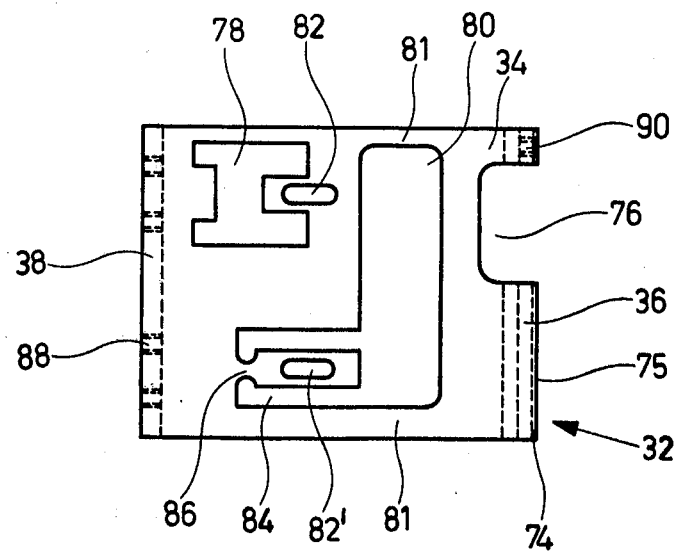
FIG. 3 shows the frame of the balance of FIG. 1 in side elevation. itself has

Referring now to the drawing in detail, and initially to FIGS. 1 and 2 there is shown only as much of a top-loading precision balance with electromagnetic weight compensation as is needed for an understanding of this invention. The conventional elements omitted from the drawing include most of the casing and other supporting structure for the illustrated operating elements, and the electrical circuitry and position sensing elements which produce a readout of the weight to be determined in the manner known from U.S. Pat. No. 3,786,884.

At the heart of the weight sensing mechanism is a pot-shaped, ferrous, magnet system 10 consisting of an upright, permanent-magnet core 12, a base plate 14, and a cylindrical envelope 16 on the base plate 14 which spacedly surrounds the core. A portion of the envelope 16 constitutes an annular pole piece 18, and the air gap 22 between the core 12 and the pole piece 18 is closed by a centrally apertured cover 20. A coil carrier 24 is suspended in the air gap 22 from the longer arm of a two-armed lever 30 by means of a screw 28 which passes through the aperture in the cover 20. A coil 26 is mounted on the carrier 24, and its windings are connected to the known electrical circuitry, not shown, which senses the position of the coil in the air gap 22, restores a desired position of the coil, and furnishes an indication of the restoring current as a measure of the weight to be determined.

The magnet system 10 is mounted in a frame 32 of nonmagnetic, aluminum-magnesium alloy sheet having the approximate shape of a hollow, rectangular prism without top and bottom walls. The two upright side walls, 34, 34' are connected integrally by a front wall 36 and symmetrical relative to an upright median plane of the frame 32. The rear ends 38 of the side walls 34, 34' are bent toward each other to constitute respective portions of the rear wall of the frame 32. Two rigid rails 42 of T-shaped cross section are horizontally fastened between the side wall ends 38 at the top and bottom of the frame 32 by means of screws 40.

Two pairs of vertically spaced screws 44 fasten the side walls 34, 34' to the envelope 16 of the magnet system 10, only one screw of each pair being seen in the drawing. The envelope 16 thus enhances the rigidity of the frame 32 in the plane of FIG. 1. The bottom plate 14 is attached to the bottom wall 70 of the balance casing by means of one front column 68 and two transversely spaced rear columns 68', the columns being attached to the casing by screws 72. The frame 32 thus is rigidly fastened to the stationary support structure of the balance. It constitutes the fixed upright member of a parallelogram suspension assembly.

The two free ends of the legs of an approximately V-shaped guide 46 of rigid sheet material are attached to the two ends of the upper rail 42, and the legs of another, identical guide 46' are fastened to the lower rail 42, a connector 48 of strip metal being fastened to each link leg and the associated rail 42 by screws 50 as a pivot flexible in a vertical plane while resisting flexural deformation in any other direction.

A rigid bar 54 is mounted upright between the apex portions of the two guides 46, 46' by means of flexible stripmetal connectors 52, the lower connector being fastened to the bar 54 by a flat-head screw 56, the upper connector by a screw 58 having a frustoconical head releasably received in a mating socket on the underside of a load-carrying pan 60 which is thus capable of translatory movement in the vertical plane defined by the parallelogram suspension assembly constituted by a portion of the frame 32, the guides 46, 46', the bar 54, and the interposed connectors 48, 55, but the pan 60 is prevented from angular displacement from its horizontal position.

The lever 30 passes through an opening 76 in the frame 32 and is suspended from the front wall 36 by two flexible connectors 62 which jointly constitute the main bearing of the illustrated balance and limit the lever 30 to pivotal movement about a horizontal axis perpendicular to the plane of FIG. 1. The very short arm of the lever 30 outside the frame 32 is attached to a boss 66 near the lower end of the bar 54 by yet another flexible connector 64 of the type shown at 48 in FIG. 2.

The assembled frame 32 is sufficiently rigid in the plane of movement of the aforementioned parallelogram suspension to resist deformation under all stresses encountered in normal service. It combines such rigidity with flexibility in other directions. The metal of the upright front edges 75 of the frame 32 is reduced by grooves 74 in the concave sides of the edges connecting the side walls 34, 34' to the front wall 36.

The aforementioned opening 76 for passage of the lever 30 extends across the entire width of the front wall 36 and partly into the side walls 34, 34', as is best seen in FIG. 3. The side walls 34, 34' are each formed with a vertically elongated window 80 leaving but narrow integral strip 81 which horizontally connect the front and rear parts of the side walls for resilient deformability at right angles to the plane of FIG. 3 without significantly impairing the rigidity of the side walls in the plane of the drawing. The desired rigidity of the front wall 36 is virtually unaffected by the opening 76, and the front wall provides a fixed location for the pivot axis of the main bearing 62. Most of the openings in the side walls 34, 34' have been omitted from FIGS. 1 and 2 in order not to crowd these figures.

The aforementioned screws 44 extend into the envelope 16 of the magnet system through horizontally elongated slots 82, 82' in each of the side walls 34, 34'. The portion of each side wall 34, 34' which bounds the slot 82' is separated from the remainder of the side wall by two branches 84 of the window 80 which extend about the slot 82' in an arc of more than 180°, leaving one narrow bridge 86 therebetween so that the rim of the slot 82' may be deflected from the plane of FIG. 3 by the inserted screw 44 without deforming the remainder of the side wall and without setting up stresses in the side wall that may affect the precision of the balance. Partial resilient deformability of the side walls 34, 34' is further enhanced by approximately I-shaped windows 78 near the rear top of each side wall partly enveloping the slots 82.

The two screws 44 in each side wall 34, 34' move vertically relative to each other with the envelope 16 relative to the main portions of the side walls when the temperature of the magnet system 10 and of the walls 34, 34' changes due to the flow of current through the coil 26 and also due to changes in the temperature of ambient atmosphere. The bridges 86 in the side walls 34, 34' are sufficiently flexible to permit relative vertical movement of the screws 44 of each pair without distortion of the main portion of the side walls.

threaded bores 88, 90 in the rear ends 38 of the side walls 34, 34' and in the front wall 36 receive the aforementioned screws 40 and mounting screws 91 for the flexible connectors 62 of the main bearing respectively.

Except for the magnet system 10, the spring-temper steel of the several thin connectors 48, 52, 62, 64, the conductors in the coil 26, and the brass of the pan 60, all illustrated elements of the balance of the invention consist of aluminum alloys containing magnesium or silicon as principal alloying elements.

The illustrated embodiment of the invention has a non-magnetic frame 32 whose side and front walls are constituted by a unitary piece of sheet metal of uniform thickness except for the grooves 74 along the upright front edges 75 and are apertured to provide desired resiliency. However, wall portions of a thickness reduced to a value greater than zero, as shown at 74, may be substituted for the openings and windows 76, 78, 80, and openings may produce the resiliency brought about in the illustrated frame by the grooves 74. Frame walls consisting of a unitary piece of metal, as illustrated, may be replaced by an assembly of pieces differing in their dimensions and/or properties. A non-magnetic light metal other than the aluminum-magnesium alloy specifically referred to above may be substituted in an obvious manner. While a rectangular prism is simple to shape with the necessary precision, a frame for the magnet system in a balance of the type described may be given a different shape without losing important advantages of this invention.

Current flowing in the coil 26 and other circuit elements not specifically illustrated produces sufficient heat to cause differential thermal expansion of the ferrous metal in the magnet system 10 and of the frame 32 which would affect the precision of the balance in the absence of the openings and windows in the frame 32 which permit resilient displacement of the frame portions continguously adjacent the screws 44 without distortion of the frame in the plane of FIG. 1. No difficulties of this kind are caused by the fixed connection of the magnet system to the casing wall 70, and the material of the latter may be chosen freely.

A unitary frame of cast aluminum alloy may be substituted for the frame 32 and the T-rails 42, but is relatively difficult to make with the required precision and does not offer relevant advantages over the illustrated frame assembly. Other non-ferrous metals may be employed in making the frame 32 or an analogous structure, but none have been found to be better than the easily worked and relatively inexpensive aluminum alloys.

It should be understood, therefore, that the foregoing disclosure relates only to a preferred embodiment of the invention, and that it is intended to cover all changes and modifications of the example of the invention herein chosen for the purpose of the disclosure which do not constitute departures from the spirit and scope of the invention set forth in the appended claims.

What is claimed is:

1. A precision balance comprising:
(a) a frame of non-magnetic material defining a cavity therein,
  (1) at least one part of said frame differing from the remainder of said frame by reduced cross section and thereby enhanced flexibility transverse to a predetermined plane, (2) said remainder of said frame including means for enhancing the rigidity of said frame in said plane;

(b) a magnet system mounted on said frame in said cavity and bounding an air gap;

(c) a parallelogram suspension assembly,
  (1) said assembly including a plurality of elements hingedly connected for movement in said plane,
  (2) a portion of said frame constituting one of said elements,
  (3) another element of said assembly including means for supporting a weighing pan for translatory movement of said pan in said plane while substantially preventing angular movement of said pan in said plane;

(d) a motion transmitting member pivotally mounted on said frame;

(e) connecting means operatively connecting said motion transmitting member to said other element for joint movement with said weighing pan; and (f) a coil of electrically conductive material mounted on said motion transmitting member for movement in said air gap during said joint movement.

2. A balance as set forth in claim 1, wherein said motion transmitting member is a two-armed lever having a longer arm carrying said coil and a shorter arm connected to said other element by said connecting means, said frame consisting essentially of light metal and being fastened to said magnet system, said part and said portion of said frame and said plane being upright in the normal operating position of said balance.

3. A balance as set forth in claim 2, wherein said part of said frame is formed with an opening therethrough.

4. A balance as set forth in claim 2, wherein said frame has three upright wall portions angularly connected by two upright edge portions, said edge portions differing from said wall portions by reduced thickness and each constituting a part differing by said reduced cross section from said remainder, the remainder including said wall portions.

5. A balance as set forth in claim 2, wherein said frame has two side walls substantially parallel to said plane, the balance further including two fasteners elongated transversely to said plane and fastening respective parts of said side walls to said magnet system, said parts of said side walls being formed with apertures enhancing flexibility of side wall parts in the direction of elongation of said fasteners.

6. A balance as set forth in claim 5, wherein said fasteners pass through respective bores of said side walls, one of said apertures in each side wall spacedly enveloping one of said bores in an arc greater than 180°.

7. A balance as set forth in claim 6, wherein said magnet system essentially consists of ferrous metal, and said non-magnetic material has a coefficient of thermal expansion sufficiently greater than the coefficient of thermal expansion of said ferrous metal to cause distortion of said side walls in the absence of said one aperture.

* * * * *